*Fig. 1.*

(No Model.) 6 Sheets—Sheet 3.

O. H. & F. C. BENNETT.
AUTOMATIC CARTRIDGE LOADER.

No. 458,557. Patented Sept. 1, 1891.

Witnesses:
J. Jessen
C. G. Hawley

Inventors:
Frank C. Bennett.
Oliver H. Bennett.
By Paul ——
Attorneys

(No Model.) 6 Sheets—Sheet 4.

O. H. & F. C. BENNETT.
AUTOMATIC CARTRIDGE LOADER.

No. 458,557. Patented Sept. 1, 1891.

Witnesses:
J. Jessen
C. G. Hawley

Inventors:
Frank C. Bennett
Oliver H. Bennett
By Paul & Minour
Attorneys

(No Model.) 6 Sheets—Sheet 5.

O. H. & F. C. BENNETT.
AUTOMATIC CARTRIDGE LOADER.

No. 458,557. Patented Sept. 1, 1891.

Witnesses.
J. Jessen
C. G. Hawley

Inventors.
Frank C. Bennett
Oliver H. Bennett
By Paul T. Munroe
Attorneys

UNITED STATES PATENT OFFICE.

OLIVER H. BENNETT AND FRANK C. BENNETT, OF JAMESTOWN, NORTH DAKOTA, ASSIGNORS OF ONE-THIRD TO JOHN S. WATSON, OF SAME PLACE.

AUTOMATIC CARTRIDGE-LOADER.

SPECIFICATION forming part of Letters Patent No. 458,557, dated September 1, 1891.

Application filed May 13, 1890. Serial No. 351,663. (No model.)

*To all whom it may concern:*

Be it known that we, OLIVER H. BENNETT and FRANK C. BENNETT, both of Jamestown, Stutsman county, North Dakota, have invented certain Improvements in Automatic Cartridge-Loaders, of which the following is a specification.

Our invention relates to improvements in machines operated by any suitable power for automatically charging with powder and shot paper cartridge-shells, its object being to provide improved means for automatically performing the entire operation of loading the shells; and it consists of a combination of mechanisms operated simultaneously from a common source of power, by means of which shells, powder, shot, and wads may be deposited in the machine in bulk and automatically distributed to the different operating parts and the shells automatically charged, crimped, and discharged therefrom, the loading being accomplished by a series of step-by-step movements, the whole operation of receiving the shell from the magazine and loading and crimping the same being performed with four of these movements.

Our invention further consists in the construction and combination hereinafter described, and particularly pointed out in the claims.

In the accompanying drawings, forming part of this specification.

In the drawings, (see Figs. 1 and 2,) 2 represents a suitable frame or support for the various working parts of our device. 3 is a drive-shaft journaled, preferably, transverse of said frame and fitted with the loose drum 4, adapted to carry a belt to connect it with a source of power. 5 is a safety-clutch arranged upon said shaft and adapted to engage said drum and to cause said shaft to rotate with said drum. Any suitable form of clutch may be employed for this purpose; but we prefer the construction shown, as it is desirable to have a clutch which shall yield to an undue strain and throw the drum out of gear to prevent breaking of any part of the machine in case of an obstruction being encountered in its working. The clutch herein shown is provided with a spiral spring 6, wound upon said shaft, one end being secured to the clutch and the other end lying in a groove 7, longitudinal of the shaft. (See Fig. 21.) A set-screw 8, threaded upon the shaft, serves to adjust the tension of the spring against the clutch. The meeting faces of the drum and clutch are preferably fitted with beveled notches or saw-teeth projections, which will serve to lock them together, so as to rotate the shaft with the drum up to any desired resistance. When this is exceeded, the engaging notches slip past each other, the clutch is thrown back from the drum, and the drum turns loosely on the shaft. In order to hold the clutch automatically out of gear, when so disengaged from the drum, we prefer to provide the clutch with a slot 9, having a turn at its inner end in the form of a bayonet-lock, and to fit the shaft with a pin 10, arranged to normally rest in the slot in the position shown in Fig. 2. When the clutch is pushed backward away from the band-wheel or drum, as shown in Fig. 21, the torsional force of the spring 6 serves to turn the clutch slightly on the shaft and cause the pin to enter the turn or notch at the inner end of the slot, and thus to lock the clutch out of gear.

Figures 2, 21, 22, 23:
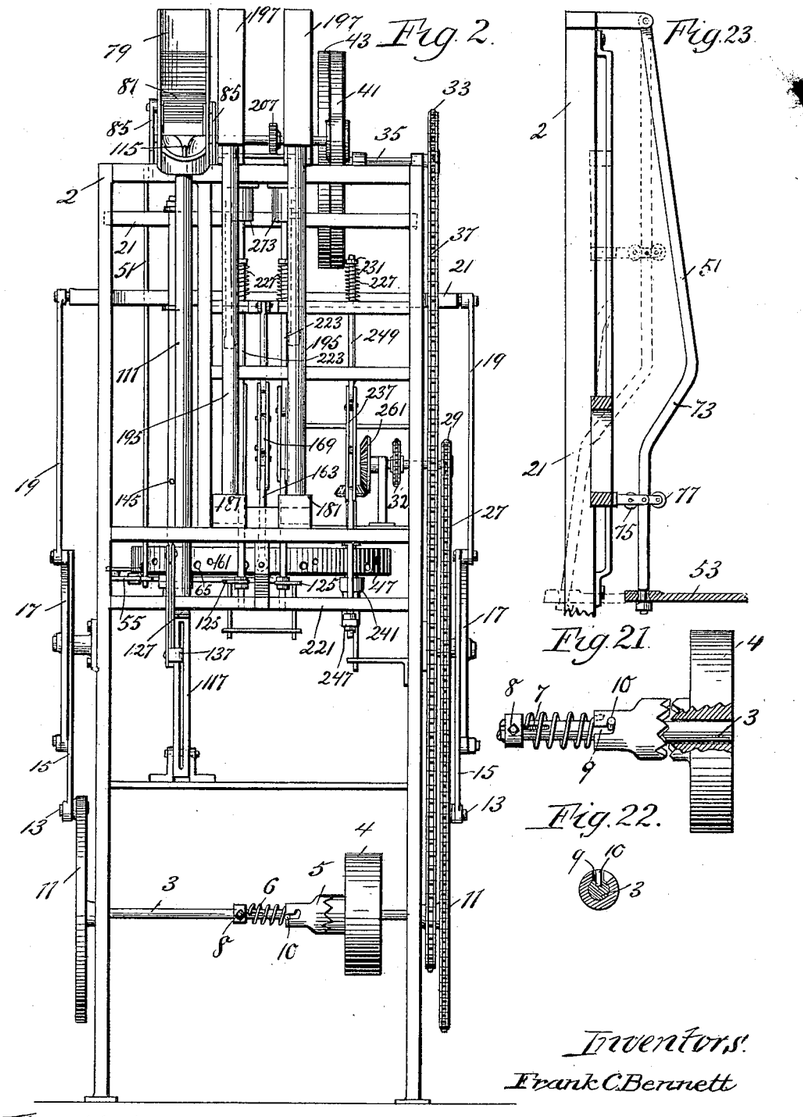
Fig. 2 is an end elevation of one-half of the machine, showing the driving shaft and pulley and the relative arrangements of the various feeding devices.
Fig. 21 is a detail of the driving-drum safety-clutch.
Fig. 22, a detail cross-section of the same.
Fig. 23, a detail of the swinging lever for turning the cartridge-wheel and the means for operating the same.
Figures 3, 4, 24:
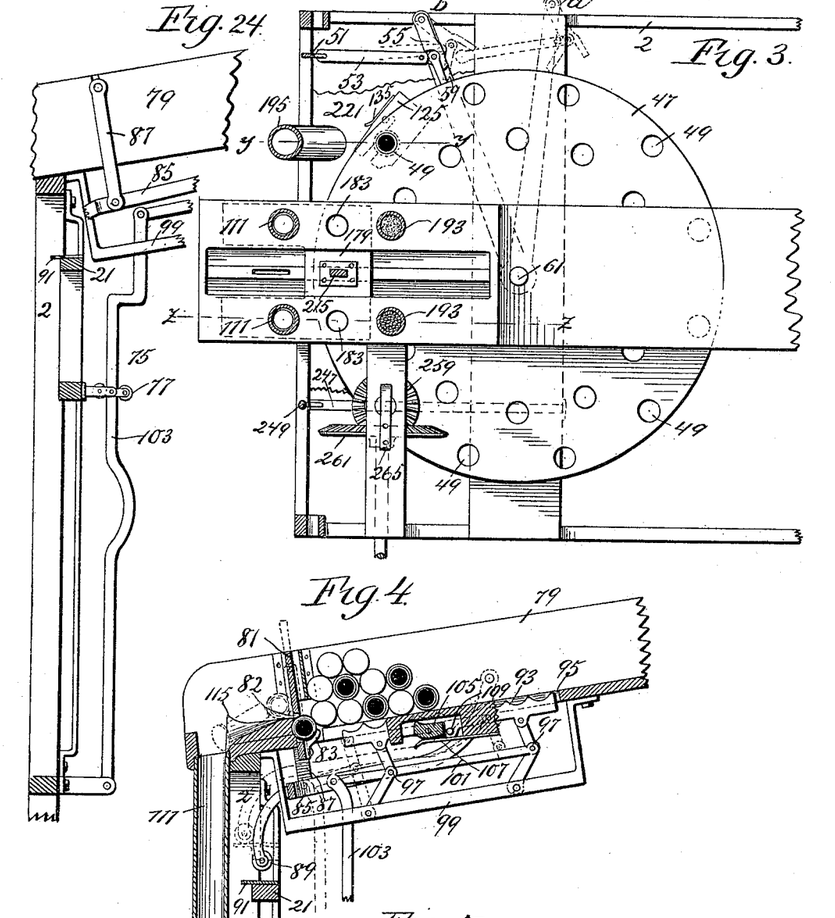
Fig. 3 is a partial horizontal cross-section of the same on line $x$ $x$ of Fig. 1.
Fig. 4 is a detail vertical longitudinal section of the cartridge-shell hopper, showing the feed mechanism of the same.
Fig. 24 is a detail of the mechanism for operating the feed-bar in the cartridge-wheel hopper.
Figures 9, 10, 11, 14:
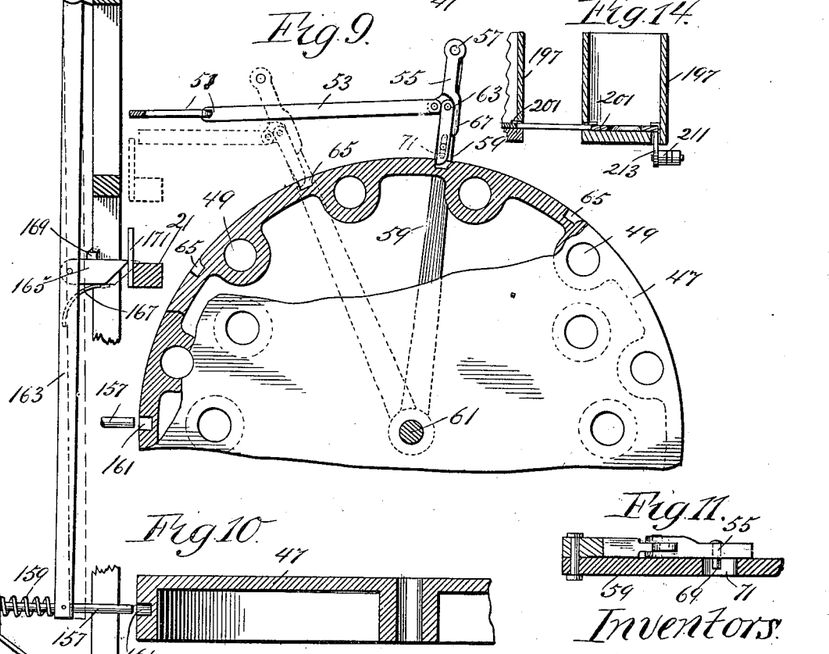
Fig. 9 is a detail plan view and partial section of the cartridge-wheel, showing the mechanism for rotating and locking the same in its step-by-step movement.
Fig. 10 is a detail of the mechanism for locking said wheel in its successive positions.
Fig. 11 is a detail sectional view of the dog or catch which engages and turns the cartridge-shell wheel.
Fig. 14 is a detail cross-section of the same on line $s$ $s$ of Fig. 12, showing the rigid connection between the slide therein and the corresponding slide in the adjacent wad-hopper.

Rigidly secured upon each end of the shaft 3, preferably outside of the frame, is a crank-wheel 11, having its crank-pin 13 linked by means of the connecting-rod 15 to the rocker or pivoted lever 17, which is linked by means of the rod 19 to the cross-head 21. (See Figs. 1 and 2.) The opposite end of each of the levers 17 is similarly linked to a like cross-head at the other end of the machine, whereby the cross-heads are caused to reciprocate alternately with each other in the same direction or simultaneously in opposite directions. One of the drive or crank wheels 11 is formed as a double-sprocket wheel with two series of sprockets, the larger 23 and the smaller 25. Arranged upon the sprocket 23 is a belt 27, running to the smaller sprocket 29, secured upon the shaft 21 of the crimping attachment hereinafter described, whereby high speed is imparted to said shaft, and a belt 30, connecting the sprocket 32 upon the shaft 31, transmits motion to the duplicate crimping mechanism at the other end of the machine through the sprocket 34 upon the shaft 36. Running from the sprocket 25 to the sprocket 33, secured to the transverse shaft 35, is the belt 37, by means of which said shaft 35 is turned from the driving-shaft. Arranged upon said shaft 35 is the double drum 39, carrying the belts 41 and 43, driving, respectively, the brush-rolls in the wad-hopper at either end of the machine, as hereinafter described. Journaled horizontally in said frame (see Fig. 3) is the cartridge-wheel 47, fitted near its periphery with a series of openings 49, of exactly the right size to receive a cartridge-shell, by means of which the shells are carried through the machine and brought into proper connection with the loading mechanism, in the manner hereinafter described. The cartridge-wheel is rotated with a step-by-step movement by suitable connections with the adjacent cross-head, by means of which one of the openings in the wheel is brought into position to receive an empty shell, while the shells in the openings in advance are carried through the machine to new positions to be subjected to successive operations in the process of being loaded. While any suitable means which will produce this movement may be employed, we prefer to use the mechanism shown in Fig. 9. A lever 51 is pivoted at its top to the frame, and its lower end is connected by means of the link 53 with the dog 55. This dog is pivoted at 57 to the radius-arm 59, which is pivoted to the arbor 61 of the cartridge-wheel. This dog is formed in two parts connected together by a knife-joint 63, which permits of its being bent upon itself to free it from the wheel. The wheel is provided with a series of notches 65, equal in number to the cartridge-holes and equidistant from each other, into which the dog enters, the joint 63 being held rigid by the stop 67. The dog engages with the notch 65 and carries the wheel forward as the radius-arm 59 is thrown forward by the operation of the lever 51. With the opposite movement of the link 53, as actuated by the lever 51, the joint 63 is bent into the position shown best in Fig. 3, which serves to withdraw the end of the dog from the notch of the wheel. The further bending of the joint is stopped by means of a pin 69, (see Fig. 11,) entering a slot 71 in the radius-arm 59. The length of the slot determines the amount of bend allowed the joint 63, which should be just sufficient to withdraw the dog from the notch of the wheel. The further reverse movement of the link 53, as actuated by the throw of the lever 51, carries the dog along around the periphery of the wheel 47 to the limit of its movement, when the dog is in position to enter the next notch of the wheel. (See Fig. 3.) With the first return or forward movement of the link 53 the knife-joint is straightened and the dog thrown into engagement with the wheel, the full lines of the arm and its attachment showing their position after the first return movement of the same, with the dog engaging the wheel in position to carry the same forward, the dotted lines showing their position at the forward limit of their throw. In order to operate the lever 51 to secure this movement of the link 53, we provide the lever with a double bend 73, (see Fig. 23,) and range it between anti-friction rolls 75 and 77, carried by the cross-head. When the cross-head is at its lowest position, the lever is thrown to the limit of its reverse or backward movement, as shown in Fig. 23. As the cross-head moves upward, the anti-friction roll 75, bearing against the inner edge of the lever 51, throws it forward and operates the connecting mechanism to turn the wheel, while with the downward movement of the cross-head the roll 77, bearing upon the outer edge of the lever in passing the bend, throws the lever back to its reverse position. Thus with each throw of the cross-head the link 53 is reciprocated to and fro and the wheel advanced one step.

Figure 5:
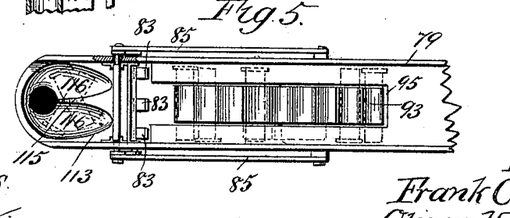
Fig. 5 is a detail plan view of the same.

Arranged at the top of the frame is a hopper 79, (see Figs. 2, 4, and 5,) adapted to receive a quantity of empty cartridge-shells for use in the machine. These may be delivered into the hopper in any preferred manner, so that they may be arranged transversely of the hopper in the manner in which they are packed in boxes for shipment. The bottom of the hopper is inclined toward the front of the machine, so as to carry the shells forward in position to be delivered from it. (See Fig. 4.) The outlet of the hopper is closed by means of a gate 81, adapted to slide upward to allow a shell to pass out of it. This gate carries fingers 83, (see Figs. 4 and 5,) projecting inwardly and adapted to pass back of the adjacent shell as the gate is lifted, and thus to separate it from the other shells in the box or hopper and to force it outward through the slot 82. By this means one shell only is discharged from the hopper with each movement of the gate. The gate is preferably automatically operated by means of a lever 85, having one end pivoted to the outside of the hopper and connected by a link 87 with the gate, the other end of the lever being bent downward and fitted with an anti-friction roll 89, adapted to be struck by the cross-head 21 as it approaches the upper limit of its movement, whereby the gate is lifted a sufficient distance to discharge a shell, a bearing-plate 91 on the top of the cross-head serving to receive the impact of the wheel 89. (See Figs. 4, 5, and 24.)

In order to prevent the clogging of the shells in the hopper and to insure the forcing outward of a shell at each movement of the gate, we provide a suitable feeding mechanism to carry the lower series of shells forward to the gate. (See Figs. 4, 5, and 24.) This consists of a transversely-fluted feed-bar 93, arranged in a longitudinal slot 95 in the bottom of the hopper and connected at each end by a toggle-joint 97 with a suitable supporting-frame 99. With the toggles straight, as shown by the dotted lines in Fig. 4, the feed-bar is in its raised position in contact with the shells; but with the joints bent backward, as shown in the full lines of Fig. 4, the feed-bar is lowered and out of contact with the shells. The toggle-joints are connected together by a link 101, which is also connected to an operating-lever 103, by means of which the link 101 may be reciprocated.

In order to secure a fourfold movement of the feed-bar, first upward into contact with shells, then forward to advance the shells, then downward out of engagement with the shells, and then backward to its first position, we arrange underneath the same a small pivoted shoe-shaped block 105, (see Fig. 4,) having its pointed or upturned end extended toward the outlet of the hopper and provided with a spring 107, bearing upon its under side, so as to hold it in proper position with the pointed end raised slightly higher than the other end, which is preferably square. A pin 109, projecting from the feed-bar, bears against the square or rear end of the block when the feed-bar is in its reverse and lowered position with the toggle-joints bent, as shown by the full lines in Fig. 4. The block thus serves as a stop against which the pin bears and upon a forward movement of the link 101 straightens the toggle-joints and forces the feed-bar upward until the pin passes over the top of the block with the continued forward movement of the link 101 and is carried over the block past its pointed or upturned end. Upon the reverse movement of the link 101 the pin strikes the rounded end of the block and is forced downward under it, thus causing the toggle-joints to be bent and the feed-bar to be lowered until the pin strikes the downturned end of the spring 107, when the thrust of the link 101 carries the pin along between the spring and block to its first-described position.

In order to throw the lever 103 to operate the feed-bar, we prefer to form it with a double bend, similar to that of the lever 51, and to pivot it at its lower end to the frame of the machine, (see Fig. 26,) arranging anti-friction rolls 75 and 77 in contact with its edges, whereby the reciprocating movement of the cross-head will serve to throw it in the same manner as the lever 103.

Figures 6, 7, 8, 20:
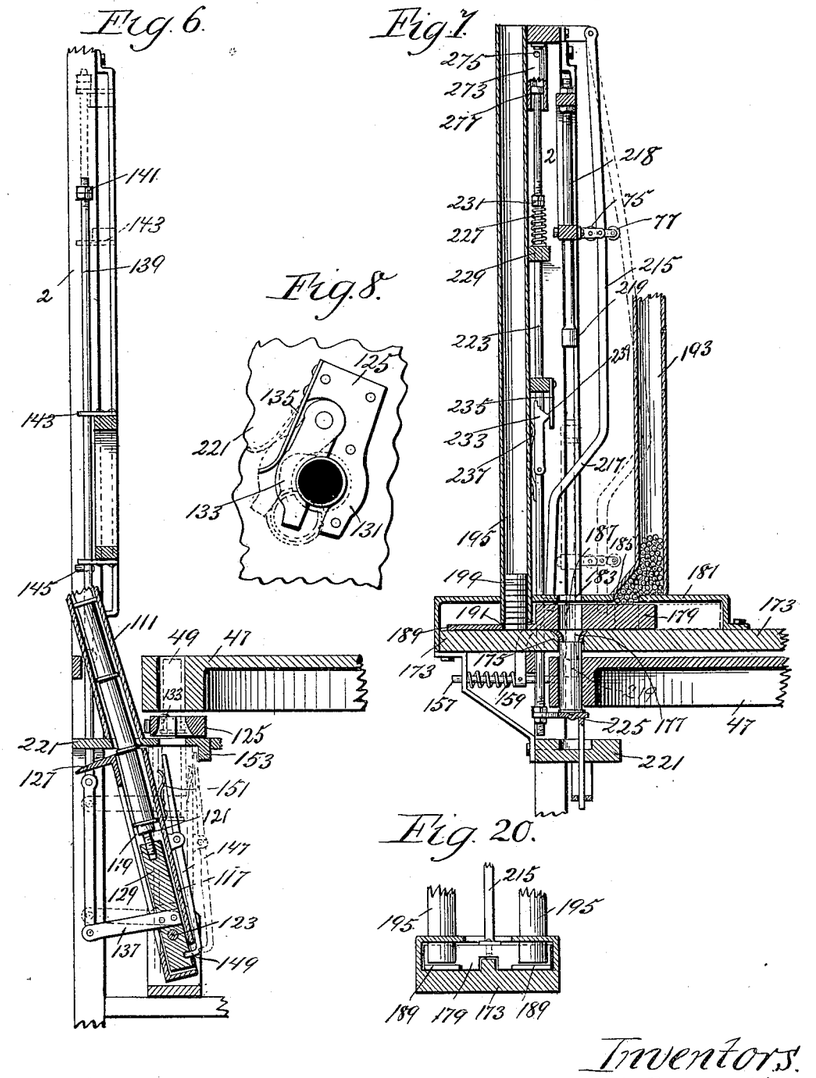
Fig. 6 is a detail vertical section of the cartridge-shell magazine and its attachments upon line $y$ $y$ of Fig. 3.
Fig. 7 is a detail vertical section of the shell-charging mechanism upon line $z$ $z$ of Fig. 3.
Fig. 8 is a detail of the cartridge-shell carriage which receives the shell from the magazine and delivers it to the cartridge-wheel.
Fig. 20 is a detail of the charging-block.

Connected to the hopper 79 outside of the gate is a vertical tube or magazine 111, (see Figs. 2, 4, and 6,) adapted to receive the shells from the hopper and convey them downward into the machine. In order that the shells as delivered to the magazine shall descend it with the cap end downward, we prefer to arrange a chute 113, (see Figs. 4 and 5,) connecting the outlet of the hopper with the magazine, having a central longitudinal ridge 115 and the grooves or ways 116 on either side of the ridge. By means of this a shell on being delivered from the hopper rolls downward upon the ridge and the heavier or cap end will tilt downward into the way on the same side of the ridge and cause the shell to fall lengthwise thereof with the cap end forward, whence it slides downward into the magazine-tube. The lower end of the magazine-tube is inclined slightly to carry its outlet underneath the cross-head of the machine and is there connected with a hollow pivoted block or carriage 117, (see Fig. 6,) its barrel being of proper size to receive a shell as delivered from the magazine-tube. The carriage turns on a pivot 123 in the frame of the machine, so that it may be rocked from its inclined position in alignment with the magazine-tube, as shown by the full lines in Fig. 6, to a vertical position, as shown by the dotted lines, registering with the opening of the shell clutch or holder 125, a projecting lip 127 at the upper end of the carriage serving to close the bottom of the magazine-tube when the carriage is turned away from the magazine. The carriage is fitted with a plunger 129, which serves as a bottom for the carriage, forming a shell-socket 119 of exactly the size to hold a single shell, a screw 121 in the top of the plunger adjusting the depth of the socket for any sized shell, and is adapted to be thrown upward when the carriage is in a vertical position to force the shell upward out of the carriage and into the shell clutch or holder 125. This holder, as best shown in Fig. 8, is provided with a fixed jaw 131 and a pivoted jaw 133, having a spring 135, bearing upon its outer side and tending to force it toward the other jaw. The meeting edges of the two jaws are circularly cut away, so that when closed together there is an opening between slightly smaller than the diameter of the shell, but made flaring or funnel-shaped below, (see Fig. 6,) so that when the shell is forced upward it will readily enter the mouth of the opening and wedge back the movable jaw to allow the body of the shell to pass through, the spring 135 gripping the jaw upon the shell, so as to hold it in position, while allowing the shell to be moved laterally out of it in the manner hereinafter described, the hinged jaw yielding or moving back to allow it to pass.

In order to rock the carriage, we prefer to secure to the plunger 129 the projecting arm 137 (see Fig. 6) and to connect to this a vertical sliding rod 139, provided with an adjustable burr or nut 141, adapted to be engaged by a lug 143 upon the cross-head as the cross-head is raised, and provided also with a stop or projection 145 to be engaged by the cross-head in its downward movement to carry the rod downward. The upward movement of the cross-head thereby raises the rod, which, acting upon the arm 137, serves first to turn the carriage 117 on its pivot until brought into a vertical position. The continued movement of the rod then carries the plunger 129 upward, forcing the shell out of the carriage and into the holder 125, while the cross-head in its downward movement engages the spur 145 and reverses the movement of the rod and plunger and of the carriage.

In order that the plunger may be held in its lower position until the carriage shall have rocked to a vertical position we prefer to provide a lever 147, pivoted upon the carriage, having an inturned point or spur 149, which engages with a corresponding socket or notch in the plunger, the spring 151 holding the spur in engagement with the plunger when in its lower position. When, however, the carriage is thrown into its vertical position, the opposite end of the lever 147 is brought in contact with the stop 153, by means of which it is depressed against the tension of the spring 151 and its opposite end thrown out of engagement with the plunger. It will thus be seen that when the carriage is in its inclined position, as shown by the full lines in Fig. 6, the plunger is locked in place and is not released, so as to be allowed to move upward, until the carriage has been turned on its pivot to a vertical position, registering with the shell-holder 125, so as to allow the shell to be thrown out of it. In the step-by-step movement of the wheel 47 its shell-openings 49 are so arranged as to be brought successively directly above and registering with the opening in the shell holder or clutch 125, (see Fig. 6,) so that when a shell is thrown upward into the holder one of the openings in the wheel is in position to receive the body of the shell, and the next forward movement of the wheel carries the shell around laterally out of the clutch. The cartridge-wheel is locked in its successive positions, as advanced step by step, by means of the catch or bolt 157, (see Fig. 10,) provided with a spring 159, which tends to advance the bolt into engagement with a socket 161 in the rim of the wheel, the position of the bolt and the arrangement of the several sockets 161 being such that they are brought into engagement successively and the wheel locked automatically each time that a shell-opening registers with the opening in the holder.

In order to unlock the wheel when it is to be turned forward, any suitable device adapted to throw back the bolt immediately before the mechanism is operated by the movement of the cross-head to advance the wheel may be employed, as by means of a lever 163, hinged at its upper end to the frame of the machine and its lower end secured to the bolt 157 and fitted with a pivoted cam 165, having a spring 167, which supports it in a horizontal position projecting into the path of the cross-head, with its upper edge bearing against the shoulder or stop 169, whereby the cam is held from upward movement, but may be turned downward against the tension of its spring. The projecting end of the cam is beveled upward and outward, so that when it is engaged by the plate 171 in the upward movement of the cross-head it is crowded back laterally, swinging the arm 163 and carrying with it the spring-bolt 157; but when struck by the plate 171 in the downward movement of the cross-head it is turned downward on its pivot to allow the cross-head to pass without moving the lever 163. The parts are so arranged that the instant the bolt 167 is thrown back out of engagement with its socket the wheel is advanced, and the bolt on being freed strikes upon the periphery of the wheel, whereon it rides until the next socket is brought around to it, into which it is forced by the spring 159.

Secured to the frame of the machine, immediately above the cartridge-wheel and projecting a short distance over the same, is the loading shelf or table 173, (see Fig. 7,) underneath which the shell is carried by the wheel from the holder 125. An opening 175 in the table registers with the shell-opening in the wheel when the wheel reaches the limit of its step movement, the shell thus standing directly under the opening.

Arranged in the top of the opening 175, directly above the end of the shell, is the funnel-shaped wad-starter 177, with its constricted opening slightly smaller than the openings of the shell.

Arranged upon the shelf 173 and adapted to slide to and fro upon the same is the reciprocating charging-block 179, (see also Fig. 20,) over which is closely fitted the cover 181, having the opening 183 directly above the opening 175 and the opening 185 at one side of the same. The charger 179 has a vertical opening 187 therethrough of such diameter that its capacity when closed at each end is that of a requisite charge of powder or shot, as the case may be. The charger is also provided with a lateral flanged extension 189, which lies upon the shelf 173, and is of the thickness of the wad or wads which are to be driven upon the charge. Through this flange is an opening 191, of such diameter as to admit a wad.

Connecting with the opening 185 and extending upward therefrom is the tube 193, leading to any suitable receptacle for the powder or shot to be conveyed by means of the tube to the loading mechanism. This tube is preferably provided with a bend at its lower end to relieve the pressure of the superimposed weight of the column of powder or shot upon the portion at the bottom of the tube, and thus to facilitate its flow therefrom. Extending downward through the cover 181 is the vertical wad tube or magazine 195, arranged in line with the openings 183 and 185, the opening 183 being equidistant from the tube 195 and the opening 185. The openings 187 and 191 of the charger are so arranged that they register, respectively, with the opening 183 and the tube 195 in one position of the charger and with the opening 185 and the opening 175, respectively, in its other position. Thus when the opening 187 is delivering its charge through the opening 175 the opening 191 is filled with a wad from the wad-tube, and when the block is reciprocated the opening 191 is brought over the opening 175, so as to deliver the inclosed wad into it, and the opening 187 is carried underneath the opening 185 and receives another charge, which is carried forward and delivered through the opening 175 with the return movement of the charger, the operation of filling and emptying the openings or receptacles of the charger thus alternating with each other.

Figure 12:
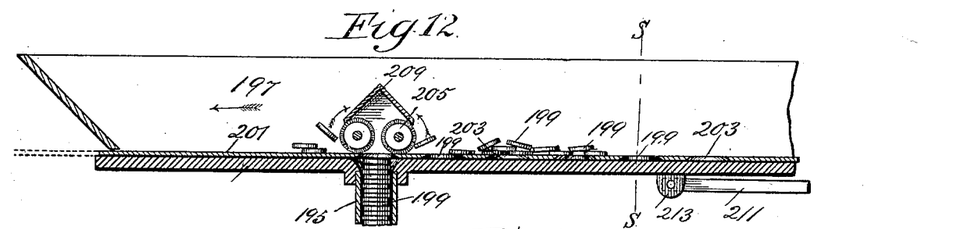
Fig. 12 is a detail partial vertical longitudinal section of the wad-hopper and its attachments.
Figure 13:
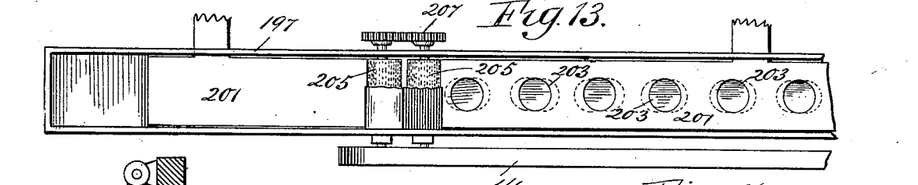
Fig. 13 is a detail plan view of the same.

The upper end of the wad-magazine 195 connects with the wad-hopper 197, (see Figs. 12 and 13,) from which the loose wads are delivered to the magazine. To insure the regular continuous replenishing of the magazine with wads 199, so that it may be kept always filled as wads are discharged from the bottom, we provide a reciprocating slide or false bottom 201 for the hopper, which serves as a wad-carrier to deliver the wads one by one to the magazine. This carrier is provided with a series of openings 203, either round or slightly elongated longitudinally of the carrier and so arranged as to pass directly over the opening into the wad-magazine as the carrier is reciprocated, the under edges of the carrier-openings being beveled at each end. The carrier is of about the thickness of a single wad and is designed to deliver the wads singly to the magazine as they are filled into the openings of the carrier, each opening being of such size as to receive a single wad.

To assist in the filling of the openings of the carrier with wads, we prefer to arrange just above and on either side of the magazine-openings and transverse of the hopper cylindrical brushes 205, connected together by gear-wheels 207, and adapted to be rotated oppositely outward and upward by means of the belt 41, running over a suitable drum on the end of one of the brush-holders. These brushes are supported in suitable journals and are in contact with the wad-carrier, so that as the carrier is reciprocated underneath them the loose wads piled on top of the carrier are thrown back by the brushes and only wads lying flat in the openings of the carrier are allowed to pass underneath, a suitable hood 209 being arranged over the rolls to prevent wads falling on top of them. The wad-carrier is reciprocated by means of a pitman 211, pivoted to a depending lug 213 and connected at its other end to the wrist or crank pin 38 upon the drive-wheel 39. When the wad-magazine is full, the wads lying in both ends of the carrier pass freely over the top of the upper wad of the magazine; but as the wads are delivered from the lower end of the magazine the column of wads in the magazine descends of its own weight, and the first wad in the carrier which is brought over the magazine drops into it and fills it, so that the magazine is always kept filled, the beveled edges of the wad-openings of the carrier assisting in forcing the wads into the magazine and pressing them downward.

The charger 179 is reciprocated in line with the centers of the magazine-tube and the openings 183 and 185 by means of the arm or lever 215, (see Figs. 7 and 20,) pivoted at its top to the frame of the machine, with its lower end engaging the charger and provided with a double bend 217, similar to the bend 73 of the lever 51, and arranged between the anti-friction rolls 76 and 78 carried by the cross-head in the same manner as the lever 51 is arranged between its rolls 75 and 77. By this means the charger is brought into the position shown in Fig. 7, with the opening 187 over the opening 175 and the opening 191 under the wad-tube, when the cross-head is raised and is thrown back into the position shown by the dotted lines as the cross-head descends, bringing the opening 187 underneath the powder or shot tube and the wad-opening 191 directly above the opening 175, the return movement of the cross-head throwing it back to its first position. Thus when the cross-head is down the opening 187 of the block fills with powder from the tube 193, and as the block is moved forward by the raising of the cross-head the powder is carried forward and discharged through the opening 175 into the shell beneath, and the wad-opening receives a wad from the tube 195, which with the return movement of the block is carried back and dropped into the wad-starter 177.

Arranged above the opening 175 and supported upon the cross-head is the rod 218, carrying the plunger 219, (see Fig. 7,) adapted to be driven through the openings 183 and 187 by the downward movement of the cross-head and to force the wad lying in the wad-starter 177 through it into the shell beneath.

Secured to the frame of the machine transversely thereof and extending underneath the rim of the cartridge-wheel a short distance below the same is the shelf 221, (see Fig. 7,) to which the clutch 125 is connected, and upon which the shells are carried when moved from the clutch by the motion of the cartridge-wheel until brought into position beneath the plunger. In order that when in this position the shell may be lifted so as to enter the hole 175 and be brought in contact with the wad-starter, we provide the vertical sliding rod 223, having suitable support upon the frame of the machine and provided with the foot 225, preferably socketed into the shelf 221, so that its upper surface shall be flush with the top of the shelf when in its socket and extending underneath the plunger, so that when the shell is brought into position it will rest upon the feet. A spiral spring 227, arranged upon the rod and bearing upon one of the fixed supports 229 of the rod with a pressure determined by the adjustment of the nut 231, threaded upon the rod, tends to lift the rod in its supports, and thereby to raise a shell standing upon the foot and to carry it into the opening 175. As the plunger descends upon the charge in the shell in the operation of the machine it forces the rod 223 downward against the tension of its spring to its normal position, where it is locked by the pivoted dog 233, engaging the stop 235 as thrown forward by its spring 237. The wads are thus always driven down upon the charge with uniform force, and the shells so charged will therefore shoot alike for equal-sized charges. On the return or upward movement of the cross-head, it strikes against the beveled surface 239 of the dog, forcing it out of engagement with the stop 235, when the spring 237 serves to again lift the rod. Similar parts are arranged in like manner one step in advance of those above described for loading with powder for the loading of the shell with shot, the two sets of mechanism being operated simultaneously and being designated by like reference-figures in the drawings.

Figures 15, 16, 17, 18, 19:
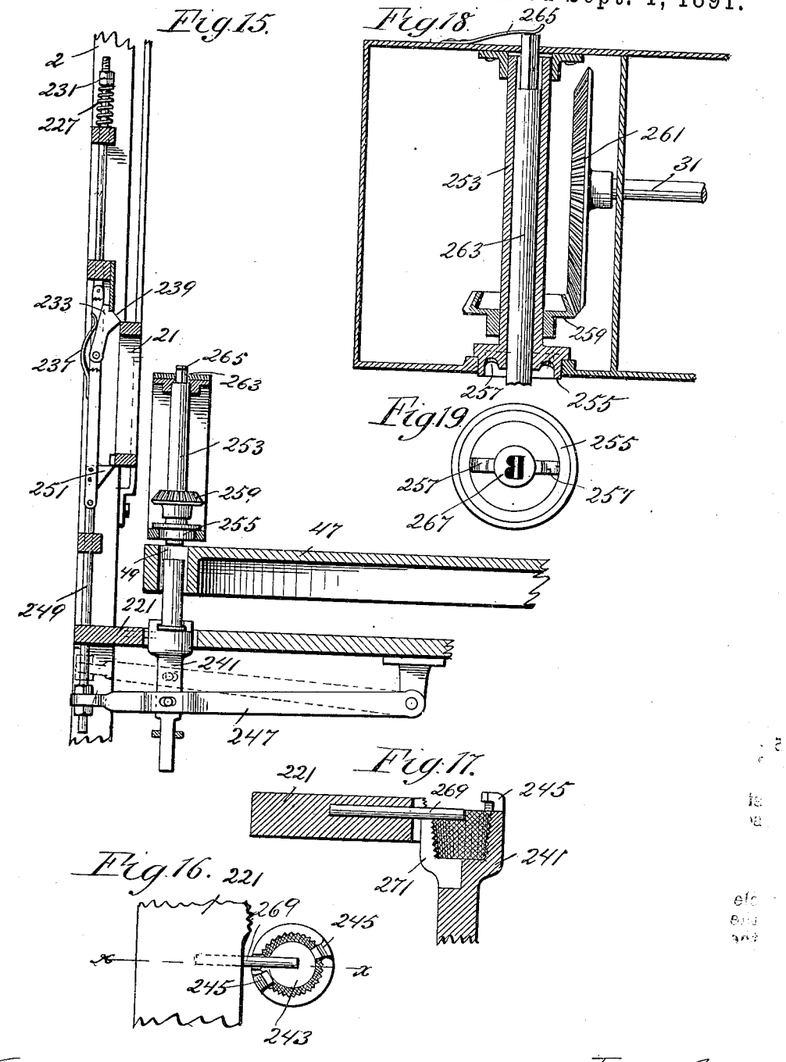
Fig. 15 is a detail of the mechanism for crimping the loaded shell.
Fig. 16 is a detail of the combined clutch and extractor for holding the shell while being crimped.
Fig. 17 is a detail vertical cross-section of the same on line $x$ $x$ of Fig. 16.
Fig. 18 is a detail vertical section of the crimper and marker.
Fig. 19 is a detail inverted plan view of the same.

Arranged one step in advance of the shot-loading mechanism is the crimping mechanism, (see Figs. 15 and 18,) to which the loaded shell is carried by the next movement of the wheel. This comprises a combined clutch and extractor 241, having a circular socket 243, narrowing toward the bottom, with roughened sides adapted to receive the metallic head of the cartridge and to hold the same from turning. The extracting-fingers 245 (see Figs. 16 and 17) project above the top of the clutch and engage the rim of the cartridge-head, which is carried under their points by the movement of the cartridge-wheel. The clutch is mounted upon a lever 247, pivoted to the frame of the machine and operated by means of a vertical rod 249, sliding in suitable supports upon the frame of the machine and provided with an adjustable lifting-spring and locking mechanism similar to those upon the plunger-rods and designated by like reference-figures. The rod is moved downward against the tension of its spring by means of the cross-head striking upon the stop or projection 251, secured to the rod. When the clutch is in its normal or lower position, it is adapted to receive the cartridge carried along off the shelf 221 in the operation of the machine. The cross-head in its continued upward movement trips the dog 233, whereupon the spring 227 is free to lift the rod and the clutch with its cartridge.

Arranged directly above the clutch is the combined crimping and stamping device. (Shown best in Fig. 18.) This comprises the hollow shaft 253, having suitable journaled support upon the frame of the machine, and having a crimping-head 255, consisting of a cross-bar having transverse concave grooves 257 equidistant from the center of the head and adapted to receive and inturn the edge of the shell when forced upward.

In the operation of the machine the crimper is preferably rotated continuously by means of the bevel-pinion 259, fixed upon its shaft and meshing with the bevel-gear 261, mounted on the shaft 31, which is driven in the manner hereinbefore described. Slidably arranged in the hollow shaft of the crimper is the marker 263, having the spring 265 bearing upon its top and tending to force it downward and provided with any desired designating die or stamp 267 (see Fig. 19) upon its lower end to imprint the wad of the cartridge-load. Thus when the loaded shell is brought into position above the socket 243 of the clutch, with the rim of the head underneath the inwardly-projecting points of the fingers 245, as the dog 223 is tripped by the upward movement of the cross-head the cartridge is forced upward, with the edges of the shell pressed into the grooves 257 of the crimper, the head of the shell being by the pressure also forced downward into the socket 243 and engaged by its roughened sides, so as to prevent its turning, the rotating of the crimper upon the edge of the shell crushing it down inwardly close to the top wad, the die 267 being imprinted at the same time upon the wad. The cross-head in its reverse or downward movement strikes the shoulder 251 of the rod 249, carrying it downward until automatically locked with the cartridge-clutch 241 at its bottom position. The fingers 245 serve to pull the shell downward, if it should become stuck in its raised position. In order that the shell may likewise at the same time be forced out of the socket 243, we prefer to secure a pin 269 in the shelf 221 and projecting through a slotted opening 271 in the side of the clutch, so as to extend underneath the head of the shell, arranged at such a height that when the clutch is in its lower position it will be even with the top of the clutch, while as the clutch is thrown upward the pin slides in the vertical slot 271 to the bottom of the socket. The shell will then, when first entered, rest upon the pin, but is allowed to descend into the socket as the clutch rises above the pin, while as the clutch descends the shell strikes upon the pin and is forced out of the socket. With the next forward movement of the cartridge-wheel the cartridge is carried out of the clutch and beyond the same, and having no further support drops of its own weight out of the cartridge-wheel and into any suitable receptacle beneath.

Figure 1:
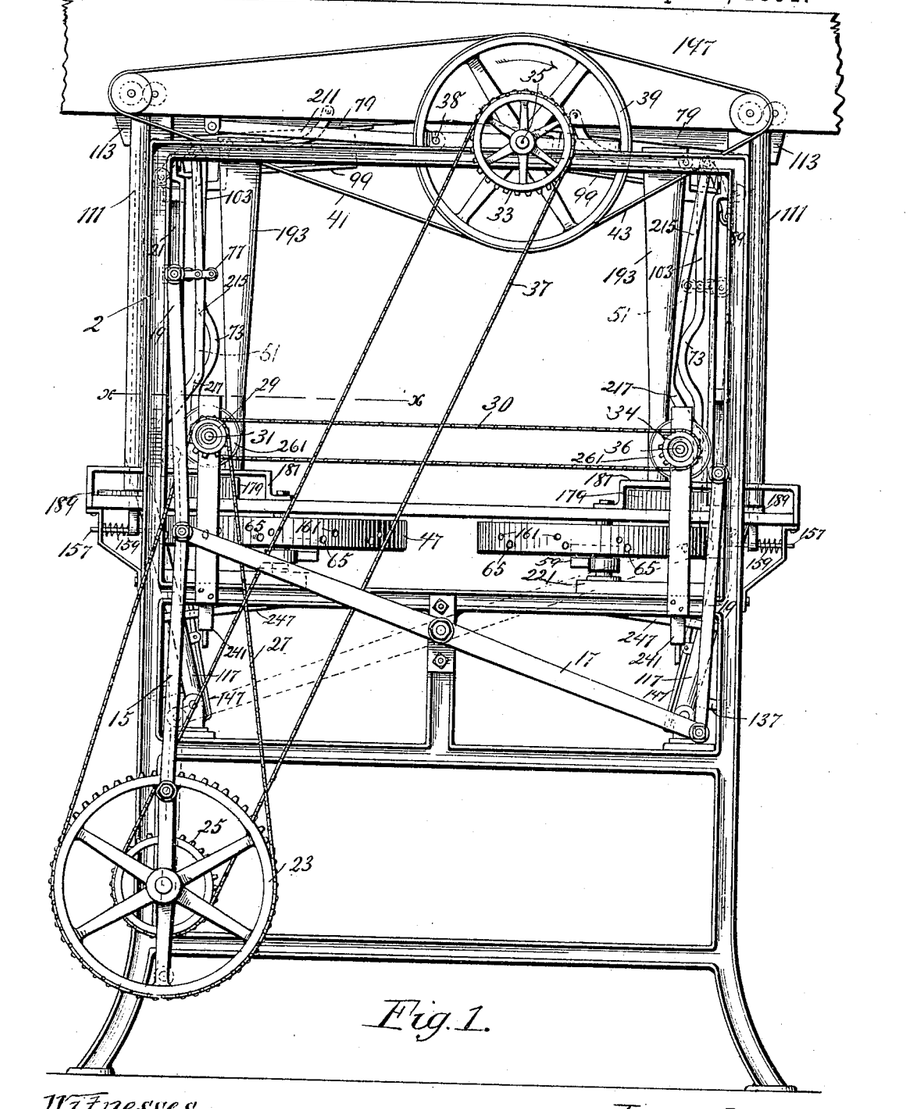
Figure 1 is a side elevation of our improved device, showing the means for transmitting the power from the drive-shaft to the various operating parts.

We prefer to construct our improved device with a duplicate set of loading appliances at the other end of the machine, as shown in Fig. 1 of the drawings, the duplicate cross-head being operated by means of the lever 17, as hereinbefore mentioned, the duplicate brushes in the wad-hopper being driven by the belt 43, and the duplicate crimping mechanism being run by means of the belt 30, driven by the sprocket 32 upon the shaft 31. It is evident that the multiplication of the parts of a machine may in like manner be carried as far as desired to increase the capacity of the machine.

In order to prevent bruising of the shells when thrown upward to receive their loads or to be carried into their other positions, I prefer to arrange above the several rods 139, 223, and 249 air-cylinders 273, (see Fig. 7,) fitted with small vents 275, in which slide pistons 277 upon the ends of the rods. The confined air thus serves as a cushion to receive the blow caused by the action of the springs 227 and to check slightly the movement of the rods.

The mode of operation is as follows: The drum 4 is connected with any suitable source of power and the machine thrown into gear by the engaging of the clutch 5 therewith. A supply of empty shells is placed in the hopper 79 and wads and powder and shot are filled into their respective receptacles. The shell-feeding device is reciprocated by its operating mechanism in the manner hereinbefore described, thus advancing the lower shells toward the outlet. The fingers of the gate as it is carried upward by its connection with the cross-head engage with the adjacent shell, (see Fig. 4,) separating it from the next shell in the series and allowing it to roll out through the opening or slot 82. The shell thence rolls downward along the chute and upon the ridge in the center of the chute, and the cap end or head from its greater weight tilts downward into the groove or way underneath. The ridge, being slightly inclined upward toward its outer end, causes the open end of the shell to be turned backward, and the shell thus lies head downward in the groove or way. Sliding down this, it is conducted into the shell magazine or tube, down which it descends into the carriage. (See Fig. 6.) The various operating parts of the machine are so arranged and adjusted that the cross-head in its first upward movement strikes the cam 165, throwing back the lever 163, thus disengaging the bolt 167 from the cartridge-wheel. (See Fig. 10.) It next throws the operating-lever 51 and carries the cartridge-wheel forward one step, bringing one of its openings over the shell-holder 125, (see Fig. 6,) in which position it is locked by the spring-bolt 157. The cross-head, continuing its upward movement, strikes the nut 141 of the rod 139, lifting the same, thereby first rocking the carriage 117 to a vertical position. The lever 149, striking against the shoulder 153, is thrown out of engagement with the plunger 129, which is lifted by the further movement of the rod, forcing the shell out of the carriage into the shell-holder and the opening of the cartridge-wheel. Supposing that other shells are in the three openings of the cartridge-wheel immediately in advance, they are all moved a step forward by the turning of the wheel, which brings one of its openings over the shell-holder, as described. The first shell in advance is carried out of the shell-holder or clutch upon the shelf 221 and into position under the powder-loader. (See Fig. 7.) The next shell is carried along upon the table from the powder-loader to the shot-loader, the next from the shot-loader to the crimper, (see Fig. 15,) and the one which was in the crimper-clutch is carried out of it and discharged into the receptacle. Simultaneously with the forcing of the shell from the shell-carriage into the holder and cartridge-wheel the cross-head trips the several dogs 233, releasing the rods 223 and the rod 249, so as to lift the several shells in the manner hereinbefore described into the openings 175 and the crimper 253, and operates the charge-lever, throwing the chargers forward, cutting off from the powder and shot tubes the predetermined charges, respectively, and carrying them forward over the openings above the shells, through which they fall into the shells. The cross-head in its downward movement throws the lever 51 back, carrying the dog or catch 55 into position to engage the next notch of the cartridge-wheel. (See Figs. 9 and 23.) The rod 139 is driven downward, throwing the shell-carriage back into its inclined position to receive another shell from the magazine. At the same time the charger-lever is thrown back, returning the charge to the powder and shot tubes and carrying the wads back from the wad-tubes into the wad-starters over the shells, which have just received their load of powder and shot. The wad-plungers are forced downward upon the wads, driving them into the shells upon the charges therein contained and driving the shells downward out of the openings 175, carrying with them their supporting-steps 225 and the connecting-rods 223, which are automatically locked by their dogs 233. Simultaneously the rod 249 is forced downward, carrying with it the cartridge-clutch 241, which withdraws the shell from the crimper, the pin 269 at the same time forcing the head of the cartridge out of the socket 243. As the crimper is running continuously, the loaded cartridge held by the clutch 241 is being crimped and the top wad indented by the die 267 during all the time that the clutch is in its raised position. The next movement of the cross-head upward repeats the operation thus described. The loaded cartridge is discharged from the machine, a new shell is inserted in the cartridge-wheel, and the empty shell held in the next opening of the wheel is advanced to receive its charge of powder, the one charged with powder is advanced to receive its charge of shot, and the one loaded with powder and shot is carried forward into the crimper. At the same time the duplicate mechanism at the other end of the machine is performing the same series of operations, except that one mechanism is one-half operation in advance of the other, or alternating in its movements with the other. In case of any obstruction being met in the operation of the machine, the increased resistance causes the safety-clutch to be thrown out of gear and the operation of the machine to be instantly stopped.

We claim—

1. In an automatic cartridge-loader, the combination of a horizontally-rotating cartridge-wheel having a series of shell-openings, a shell-hopper above the same, a shell-tube to convey shells from said hopper to a point beneath the wheel, a clutch adjacent to the lower end of the tube and immediately underneath the wheel in such position that the shell-openings of the wheel successively register with the clutch-opening, a pivoted carriage underneath said tube and clutch, having a socket adapted to receive a single shell head downward and registering in one position of the carriage with the shell-tube and in the other position with the clutch-opening, a plunger in said carriage to expel a shell therefrom, and means, connected with the driving mechanism, for rocking said carriage and operating said plunger, substantially as described.

2. In an automatic cartridge-loader, the combination of an upright conduit for conveying shells longitudinally of itself to the loading mechanism, a hopper adapted to hold the shells arranged transversely therein with heads on either side indiscriminately, a chute connecting said hopper with the upper end of said conduit, means for delivering the shells successively from said hopper into said chute transversely thereof, two longitudinal grooves or ways in the bottom of said chute, both leading to said conduit, and a ridge or projection between said ways by means of which the rolling movement of a shell is stopped and the heavier or cap end thereof is caused to tilt downward into the groove beneath, and thus to be delivered head first to the conduit, substantially as and for the purposes set forth.

3. In an automatic cartridge-loader, the combination, with its shell-conduit, of a hopper adapted to receive and hold shells transversely therein, having an opening at one end thereof, a chute leading from said opening to said conduit, a shell-turning device in said chute, a gate for said opening operated by suitable connections with the driving mechanism for delivering single shells successively from the hopper transversely of said chute, and an automatic feed arranged in said hopper and actuated by suitable connections with the driving mechanism for carrying the shells in the hopper forward to the gate, substantially as and for the purposes set forth.

4. In a cartridge-loader, the combination, with its shell magazine or tube, of a hopper adapted to receive and hold shells arranged transversely therein and having a longitudinal slot in the bottom thereof, a transversely-fluted feed-bar arranged in said slot, mechanism for actuating said feed-bar with a four-fold movement first upward into contact with the shells in the hopper, then forward to advance the layer of the shells in contact therewith, then downward and backward to its first position, a vertically-sliding gate at the front of the hopper, having fingers adapted to engage the adjacent shell in the hopper and to force the same out of the hopper, and a chute connecting said hopper with said magazine and having a shell-turning device arranged therein, substantially as and for the purposes set forth.

5. In a cartridge-loader, the combination, with its shell-magazine, of a shell-hopper adapted to hold shells arranged transversely thereof, a feed device arranged in the bottom of said hopper, a vertically-sliding gate arranged at the front of the hopper, having a transverse slot and carrying fingers adapted to engage the adjacent shell in the hopper and deliver it through said slot, an inclined chute connecting the hopper with the magazine, provided with ways or grooves leading to the opening in the magazine, and a ridge or projection between said grooves or ways adapted to turn a shell rolling down said chute into and longitudinally of one of said grooves, and means for operating said feed device and said gate, substantially as and for the purposes set forth.

6. In a cartridge-loader, the combination of the upright magazine 111, the hopper 79, provided with a feeding device arranged in its bottom, the sliding gate 81, arranged therein, having a transverse slot 82 and the fingers 83, the chute 113, connecting said hopper with said magazine, the central ridge 115, arranged in said chute, the inclined ways 116 on either side of said ridge leading to said magazine, and means connected with the driving mechanism of the machine for automatically operating said feeding mechanism and said gate synchronously with the movements of the other parts of the machine, as and for the purposes set forth.

7. In an automatic cartridge-loader, the combination, with its shell magazine and hopper, of a feeding mechanism arranged in the bottom of said hopper, comprising the transversely-fluted feed-bar 93, toggle-joints 97, supporting the same upon the depending frame 99, the link 101, connecting said toggle-joints with the operating-lever 103, the laterally-projecting pin 109, fixed to said feed-bar, the shoe-shaped block 105, adapted to serve as a stop for said pin to prevent the forward movement of said feed-bar until lifted sufficiently by the straightening of the toggle-joints to carry the pin over said block and as a guide to direct said pin downward in its reverse movement, and the spring 107, bearing against the under surface of said block, adapted to serve as a guide to direct said pin in its reverse movement between itself and the block, substantially as described.

8. In a cartridge-loader having a shell hopper and magazine, the combination therewith of means for turning the shells delivered from said hopper and directing them cap end downward into said magazine, comprising an inclined chute leading from the outlet of the hopper to the magazine, an inclined groove or way on each side of said chute leading to said magazine, and an upwardly-inclined ridge or projection arranged between said grooves, substantially as described.

9. In an automatic cartridge-loader having a conduit for receiving shells transversely thereof and for delivering them longitudinally thereof, the combination therewith of means for turning the shells from a transverse to a longitudinal position in said conduit, with the head or cap end forward, comprising, in combination, two longitudinal grooves or ways in the bottom of said conduit and a central inclined ridge or projection between said grooves extending above the bottom of the conduit, upon which the shells roll in their descent and by means of which their cap end is caused to tilt downward and forward into the grooves beneath, substantially as described.

10. In an automatic cartridge-loader, the combination, with its shell magazine or tube, of a hopper adapted to receive and hold shells transversely therein, a sliding gate having fingers adapted to engage the adjacent shell in the hopper and to force it out of the same, and a chute connecting said hopper with said magazine and having a shell-turning device arranged therein, substantially as and for the purposes set forth.

11. In an automatic cartridge-loader, the combination of an upright shell-tube, an inclined chute leading thereto, a shell-hopper connected with said chute, mechanism for delivering shells successively from said hopper to and transversely of said chute with the cap ends thereof on either side of said chute indiscriminately, and a shell-turning device in said chute by means of which said shells are turned from a transverse to a longitudinal position, with the cap end forward, substantially as described.

12. In a cartridge-loader, the combination, with its cartridge-wheel and magazine-tube, of the rocking carriage 117, arranged underneath the outlet of said magazine and having an adjustable receptacle or socket adapted to receive a single shell from said magazine, a plunger arranged in said carriage, means connected to said plunger and carriage, operated by the driving mechanism of the machine, adapted to rock said carriage away from said magazine and underneath an opening of said cartridge-wheel and to reciprocate said plunger in said carriage, and automatic locking mechanism holding said plunger from movement upward in said carriage, except when in line with an opening in said cartridge-wheel, substantially as and for the purposes set forth.

13. The combination of the magazine-tube 111, the cartridge-wheel 47, the pivoted carriage 117, with its barrel or shell-socket registering in its inclined position with the magazine and in its vertical position with the shell-opening of the cartridge-wheel, the plunger 129, arranged in said carriage and serving as a bottom to its shell socket or receptacle and having the arm 137, the reciprocating rod 139, operated by the driving mechanism of the machine and connected to said arm 137, the pivoted dog 137, adapted to lock said plunger when the carriage is in an inclined position, and the shell holder or clutch 135, arranged underneath and registering with the shell-opening of the cartridge-wheel and adapted to receive and support a shell in the wheel as delivered to it from said carriage, substantially as and for the purpose set forth.

14. In an automatic cartridge-loader, the combination of a cartridge-wheel provided with shell-openings, mechanism for feeding shells into said openings, and a fixed clutch intermediate of the cartridge-wheel and shell-feeding mechanism through which the shell is thrust into the openings in the wheel and which serves to support the shell in the wheel, but releases it when moved laterally by the 15. In an automatic cartridge-loader, the combination, with its cartridge-wheel provided with a series of shell-receptacles and mechanism adapted to feed shells thereto, of a supporting-clutch intermediate of said feeding mechanism and wheel adapted to support a shell in said wheel as first deposited therein until advanced toward the loading mechanism, comprising a pair of spring-controlled jaws with the space between them slightly narrower than the diameter of a shell, substantially as described.

16. In a cartridge-loader, the combination, with its cartridge-wheel, of means connected with the driving mechanism of the machine for rotating said wheel with a step-by-step movement and for locking the same in its successive positions, comprising, in combination, the knife-jointed dog 55, pivoted to the radius-arm 59 and linked to the swinging lever 151 and having a stop-pin 169, lying in a slot 71 in the radius-arm, adapted, when in its extended or straight position, to engage with the periphery of said wheel, a spring-bolt 157, adapted to engage and lock said wheel at the limit of each successive step-by-step movement, and means for alternately operating said dog and releasing said bolt, substantially as described.

17. In a cartridge-loader, means for automatically feeding wads to the loading mechanism thereof, comprising, in combination, the upright wad tube or magazine 195, the hopper 197, arranged at the top thereof, a sliding wad carrier or feeder adapted to be moved upon the bottom of the hopper and across the opening in the magazine and having openings therethrough, each adapted to receive and hold a wad with its face resting upon the bottom of the hopper, the under edges of said openings being beveled or rounded, and means for moving said carrier across the opening to the magazine, substantially as described.

18. In a cartridge-loader, means for automatically delivering wads to the loading mechanism, comprising, in combination, a wad hopper or receptacle, an upright cylindrical tube of suitable diameter to carry a series of wads regularly arranged therein with their faces in contact with each other, connected with the bottom of said hopper, and a carrier arranged in said hopper and traveling over the opening to said tube, having openings therethrough, each adapted to receive a wad and to carry it along the bottom of said hopper and deposit it in said tube, substantially as described.

19. The combination of the tube 195, the hopper 197, the clearing-brushes 205, rotating oppositely on either side of the opening to said tube, the perforate carrier 201, arranged in said hopper, and means for reciprocating the same upon the bottom of said hopper underneath and in contact with said brushes.

20. Means for delivering wads successively to the magazine or feeding-tube, consisting of a hopper adapted to hold a promiscuous mass of wads, and a carrier sliding upon the bottom of the hopper and over the top of said tube, of substantially the thickness of a single wad, having openings therethrough of suitable size to allow a wad to lie therein and arranged to successively register with the tube-opening in the movement of the carrier.

21. Means for delivering wads successively to the magazine or feeding-tube, comprising, in combination, a carrier of substantially the thickness of a single wad, traveling over the top of said tube and having openings therethrough, each of suitable size to allow a wad to lie therein and adapted to successively register with the tube-opening in the movement of the carrier, and clearing-brushes rotating in contact with the upper surface of said carrier.

22. In a cartridge-loader, means for automatically charging a shell with powder or shot and wads, comprising, in combination, a suitable table or shelf having an opening therethrough adapted to receive the open end of a shell from beneath, a charging-block adapted to be reciprocated upon said table over said opening and having an opening of sufficient size to hold a predetermined number of wads and another opening adapted to hold a predetermined charge, said openings alternately registering with the shell-opening in the reciprocating of the block and with tubes or conduits for wads and powder or shot, and a plunger adapted to force into the shell the wads deposited by the charger, substantially as and for the purposes set forth.

23. In a cartridge-loader having a suitable loading table or shelf with an opening therethrough for conveying the charge and the wads to a shell beneath and a wad-plunger reciprocating through said opening, means for automatically conveying wads and charges of powder or shot to said opening, consisting of a reciprocating block sliding upon said table over said opening and having an opening therethrough of capacity to hold a predetermined charge and another opening adapted to receive a predetermined number of wads from suitable sources of supply and adapted, respectively, to alternately receive and convey wads and charges of powder or shot from the sources of supply to said shell-opening, substantially as and for the purposes set forth.

24. The combination of the shelf 173, having the opening 175 arranged therethrough, adapted to receive the open end of a cartridge-shell, and the wad-starter 177, arranged in the top of said opening, the plunger 219, reciprocating through said opening, the wad-tube 195, arranged at one side of said opening 175, the powder or shot tube 193, arranged on the opposite side of said opening, and the reciprocating block 179, having the charge-opening 187 and the wad-opening 191, adapted, respectively, to alternately register with said wad-tube and said powder or shot tube and with said opening 175, substantially as and for the purposes set forth.

25. In a device of the class described, the combination, with a loading-shelf having a shell-opening and a powder or shot tube above said shelf and offset from said shell-opening, of a charging-block arranged upon said shelf and underneath the outlet of said tube, provided with an opening therethrough of adjusted capacity to contain a predetermined charge, and means for reciprocating the same and causing its opening to alternately register with said shell-opening and said tube.

26. In a device of the class described, the combination, with the loading-shelf having a shell-opening therethrough, a plunger adapted to be forced downward through said opening, and tubes respectively for powder or shot and wads, arranged above said shelf on either side of said opening, of a charging-block arranged upon said shelf underneath said tubes and having openings therethrough for holding, respectively, wads and a charge of powder or shot, and means for reciprocating said block so as to cause its openings to register alternately with the powder or shot tube and shell-opening and with the shell-opening and wad-tube, substantially as described.

27. In a cartridge-loader having a loading table or shelf provided with an opening adapted to receive the open end of the shell from beneath and to convey to said shell the charge and wads, means for automatically inserting a shell into said opening, consisting of the vertically-sliding rod 223, provided with a lifting-spring, an automatic locking mechanism, and the foot 225, arranged underneath said opening, adapted to receive a shell and to raise it upward into said opening when actuated by the movement of said rod, in combination with means for automatically tripping said locking mechanism and means for forcing said rod downward with its supported shell, substantially as and for the purposes set forth.

28. In an automatic cartridge-loader, the combination, with the loading-shelf having a shell-opening therethrough, of mechanism for carrying a shell underneath said opening, spring-actuated mechanism for lifting and supporting the shell in said opening, a wad-plunger reciprocated through the shell-opening and adapted to drive a wad into said shell upon the charge and to force the shell downward out of the opening against the tension of the lifting mechanism, and automatic locking mechanism adapted to hold said lifting mechanism in its lower position and to be tripped by the primary driving mechanism to release it, substantially as and for the purposes set forth.

29. The combination of the vertically-movable clutch 241, having the socket 243, the slot 271 through the said wall of said socket, the fingers 245 upon the rim of the socket projecting over the same, the fixed extractor-pin 269, projecting into said socket through said slot 271, and the continuously-revolving crimping-head 255, having transverse grooves 257, substantially as described.

30. The combination of the vertically-movable clutch having a socket to receive the head of the cartridge, crimping mechanism above said clutch adapted to crimp a cartridge when lifted by the clutch, and a fixed extractor-pin projecting into said socket beneath the head of the cartridge and adapted to force the cartridge from the socket as the clutch is lowered, substantially as and for the purposes set forth.

31. The combination of a vertically-movable clutch adapted to receive the head of a cartridge, crimping mechanism above said clutch, extractor-fingers upon said clutch engaging the rim of the cartridge-head, adapted to withdraw the cartridge from the crimper, and a fixed extractor-pin projecting into said clutch beneath the head of the cartridge and adapted to force it out of the clutch as the clutch is lowered, substantially as described.

32. The combination, with an automatic cartridge-crimping device, of a vertically-movable clutch adapted to receive and hold the head of the cartridge and having fingers engaging the rim of said head, adapted to withdraw it from said crimper, a socket to receive the cartridge-head and hold the same from turning, means for forcing the shell out of said socket with the downward movement of the clutch, a pivoted lifting-lever engaging said clutch, a sliding rod engaging said lever and adapted to operate the same, provided with a lifting-spring and a self-locking mechanism, and means for moving said rod against the tension of the spring to permit it to be locked and for tripping said locking mechanism, so as to release said spring, substantially as and for the purposes set forth.

33. In an automatic cartridge-loading machine, the combination, with a shell-holding wheel having rotating and self-locking mechanism, a loading-shelf having shell-openings, a charging-block upon said shelf adapted to receive wads and loads of powder and shot from supply-tubes and to carry them alternately to the shell-openings of the shelf, and wad-plungers arranged above said openings, of a vertically-reciprocating cross-head actuated by the primary driving mechanism, adapted to actuate said rotating mechanism and trip the locking mechanism of said wheel to impart a step-by-step movement to said wheel to reciprocate said charging-block and actuate said plungers, substantially as described.

34. In an automatic cartridge-loader, the combination, with the loading mechanism, of a vertically-movable support for holding the shell while being charged, a plunger for driving the wads upon the charge, and an adjustable spring engaging said support and resisting the action of said plunger, whereby the wads are secured upon the charge with uniform pressure, substantially as described.

35. In a cartridge-loader, the combination, with its loading mechanism, having a vertical plunger for driving the wads into the shell, of a shell-support adapted to hold the shell while being loaded, a spring lifting said support, but yielding to the thrust of the plunger, whereby uniform pressure is exerted by the wads upon the charges in the shells, locking mechanism engaging said support when driven downward by the plunger, and means for tripping said locking mechanism, substantially as described.

36. In an automatic cartridge-loader, the combination, with its loading mechanism, of a shell-support, an adjustable spring engaging said support and carrying it toward the loading mechanism, and a wad-plunger reciprocating in line with the movement of said support and adapted to drive a wad into the shell held by it and to force the shell and its support away from the loading mechanism, substantially as and for the purposes set forth.

37. In a cartridge-loader, the combination, with its loading mechanism, of a vertically-movable shell-support, a spring adapted to lift said support, means for adjusting the tension of said spring, a piston arranged upon said support, and an air-cylinder inclosing said piston, whereby the air inclosed between the piston and the head of the cylinder serves as an elastic cushion acting in opposition to said spring.

38. Means for delivering wads successively to the magazine or feeding-tube, comprising, in combination, a hopper to receive a promiscuous mass of wads, a carrier of substantially the thickness of a single wad sliding upon the bottom of the hopper and over the top of said tube and having openings therethrough, each of suitable size to allow a wad to lie therein and successively registering with the tube-opening, and means for clearing superfluous wads from the surface of the carrier as it passes over the tube-opening, substantially as described.

In testimony whereof we have hereunto set our hands this 29th day of April, 1890.

OLIVER H. BENNETT.
FRANK C. BENNETT.

In presence of—
  JNO. S. WATSON,
  W. B. S. TRIMBLE.